Jan. 2, 1934.  A. JANSON  1,941,986
CONVEYER TRUCK LOADER
Filed June 1, 1931  3 Sheets-Sheet 2
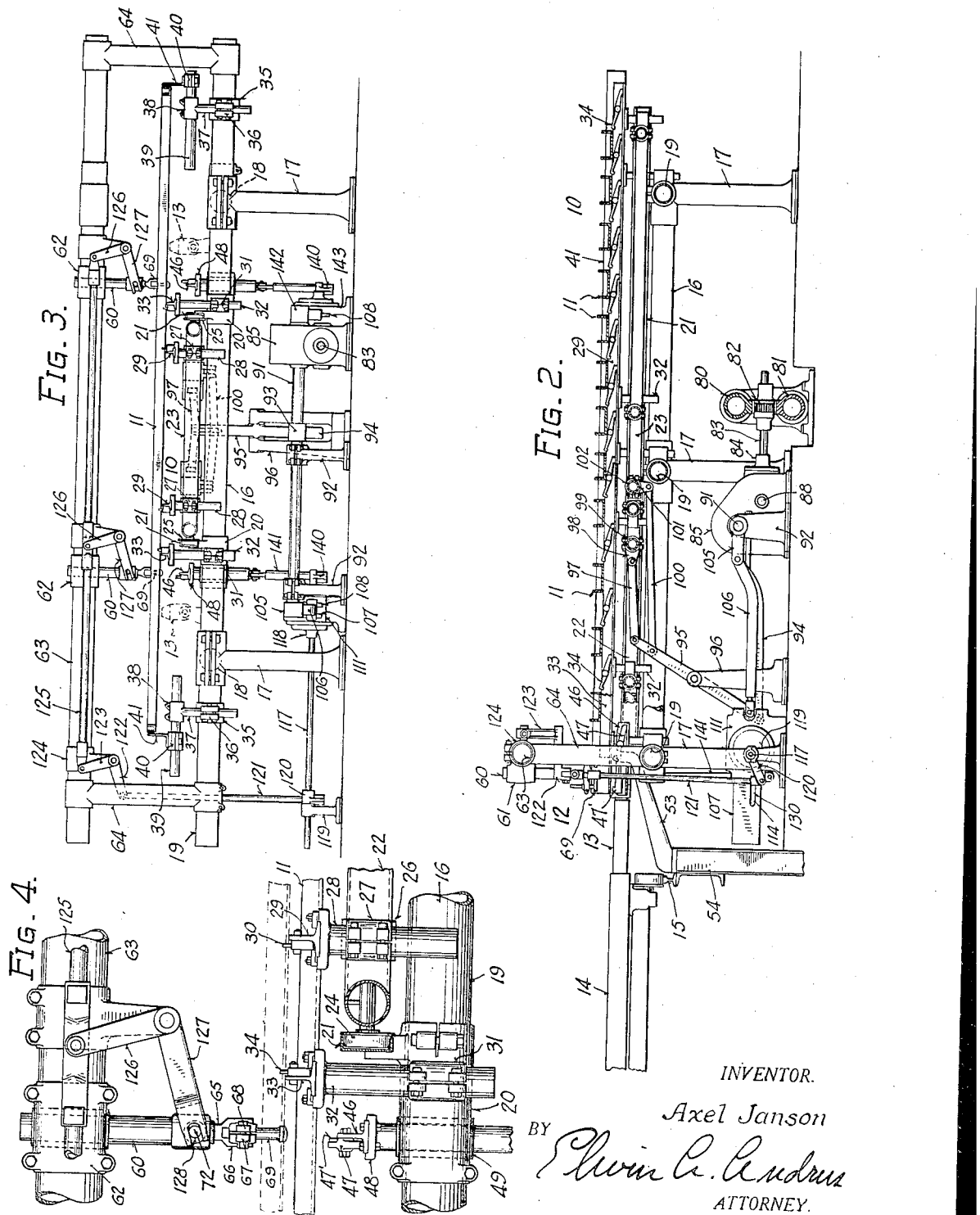
INVENTOR.
Axel Janson
BY
ATTORNEY.

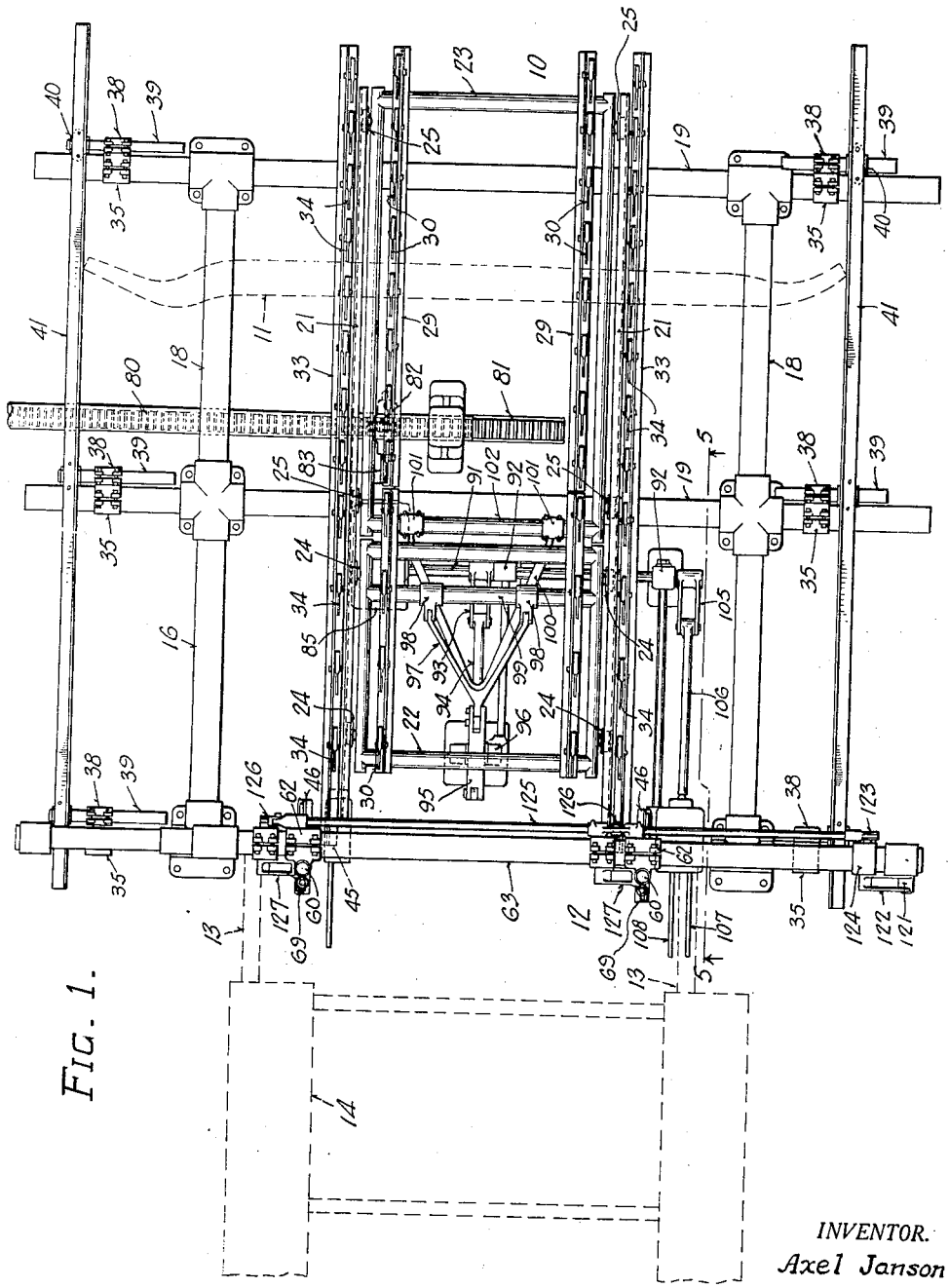

Jan. 2, 1934.  A. JANSON  1,941,986
CONVEYER TRUCK LOADER
Filed June 1, 1931   3 Sheets-Sheet 3
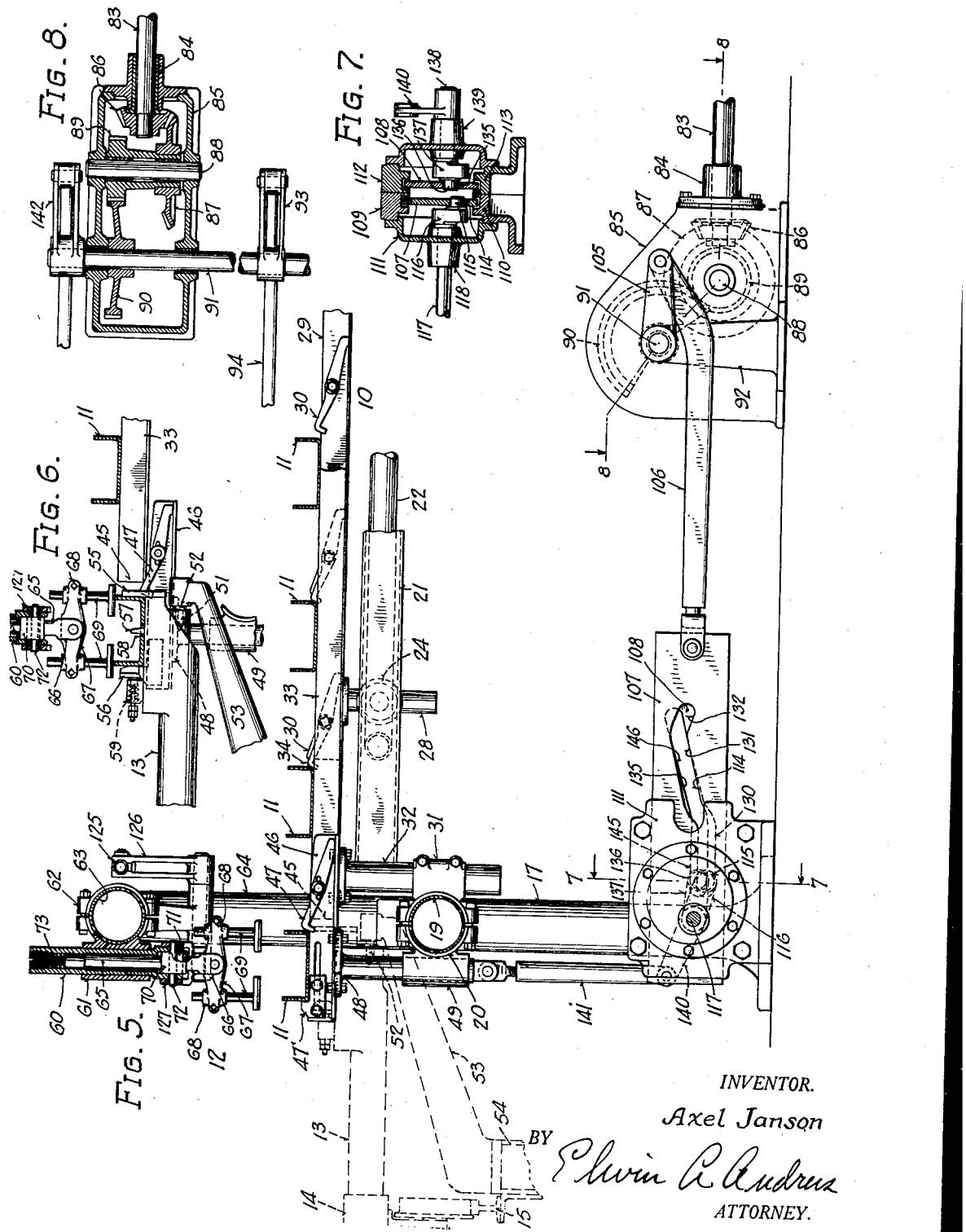
INVENTOR.
Axel Janson
BY
ATTORNEY.

Patented Jan. 2, 1934

1,941,986

UNITED STATES PATENT OFFICE 1,941,986

CONVEYER TRUCK LOADER

Axel Janson, Milwaukee, Wis., assignor to A. O. Smith Corporation, Milwaukee, Wis., a corporation of New York Application June 1, 1931. Serial No. 541,329

25 Claims. (Cl. 214—1)

This invention relates to a machine for loading conveyer trucks of a production assembly and finishing line such as disclosed in copending application filed June 1, 1931, Serial No. 541,424.

Referring to the drawings which illustrate a preferred embodiment of the invention, Figure 1 is a plan view of the machine of the present invention;

Fig. 2 is a side elevation thereof, certain parts being shown in section and others being broken away;

Fig. 3 is an end elevation viewed from the receiving end thereof;

Fig. 4 is an enlarged detailed view partly in section of a portion of the machine shown in Fig. 3;

Fig. 5 is an enlarged cross sectional view taken on a plane indicated by the line 5—5 in Fig. 1, certain parts being shown in different positions;

Fig. 6 is a view showing the relative positions of the parts of the loading mechanism at the time when an automobile frame element is being positioned on a conveyer truck;

Fig. 7 is a sectional view of the cam box shown in Fig. 5 taken on a plane indicated by the line 7—7 of Fig. 5; and Fig. 8 is a sectional view of the drive taken on the line 8—8 of Fig. 5.

The device of the present invention comprises generally a conveyer mechanism designated in its entirety by the reference character 10, a mechanism for discharging from the conveyer mechanism elements 11 which have been conveyed therealong, the latter mechanism being designated generally by the reference character 12, and means for actuating both of these mechanisms. The discharge mechanism 12 positions the elements 11 upon extensible arms 13 of conveyer trucks 14, which latter are thereafter intermittently driven along tracks 15 of an assembly line such as disclosed in the application above referred to for the purpose of performing successive assembly and finishing operations upon the elements 11. The elements 11 in the present instance are illustrated as being the side bar members of automobile frames.

The conveyer mechanism and the conveyer discharging mechanism are supported upon a frame work 16 which in turn is supported by standards 17. The frame work 16 consists of side members 18 and cross members 19.

The conveyer mechanism

Secured to the cross members 19 of frame work 16 are collars 20 which support channels 21, the latter constituting rails for the travel therealong of reciprocable carriages 22 and 23. Wheels 24 secured to the side bars of carriage 22, and wheels 25 secured to the side bars of carriage 23 ride in the channels 21 to guide the respective carriages in their reciprocatory movement.

Secured to the cross members of each of the carriages 22 and 23 are collars 26 which have laterally projecting split clamping members 27. Adjustably secured in the split clamping members 27 are supports 28 upon the tops of which are mounted supporting rails 29, which may be in the form of angle bars or inverted T bars, and these rails are adapted to support thereon the elements 11 to be propelled by the conveying mechanism. Pivotally secured intermediate their ends to the vertical web of the supporting rails 29 on each of the carriages, are a plurality of feed dogs 30. These feed dogs are so pivoted to the supporting rails 29 that the ends toward the discharge end of the conveyer normally project above the top of the rails. Thus when the carriages are actuated toward the discharge end of the conveyer, that is, the left-hand end as viewed in Fig. 1, the feed dogs are adapted to engage the side bar elements 11 which are supported on the top of the rails 29 and convey the same to the discharge end of the conveyer where they are positioned upon the conveyer truck 14 by the discharging mechanism 12. The conveyer trucks are thereafter carried along rails 15 to successive stations for assembly and finishing operations as above set forth and as fully described in the previously referred to application.

Projecting laterally from the collars 20, are split clamping members 31 within which are adjustably secured supports 32. Mounted upon the tops of these supports 32 are supporting rails 33 similar to the rails 29 mounted upon the carriages. The rails 33 are adjusted to the same height as the rails 29, and together the rails 29 and 33 are adapted to support the side bar elements 11. The rails 29 and 33 may be adjusted to various heights to suit the requirements of the size and shape of the particular elements 11 to be conveyed.

Pivotally secured to the vertical web of the rails 33 are feed dogs 34 similar to the dogs 30, and which have their ends toward the discharge end of the conveyer normally projecting above the upper edge of the rails 33. When, therefore, the carriages 22 and 23 are actuated toward the discharge end of the conveyer, the side bar elements 11 which rest upon the rails 29 and 33 will be propelled toward the discharge end of the conveyer by the feed dogs 30. During this movement of the side bar elements, there will be no relative movement between the rails 29 and the side bars, but there will be a sliding movement of the side bars over the rails 33. This sliding movement of the side bars 11 over the rails 33 will be permitted by the dogs 34 since the side bars 11 engage sloping faces of the dogs 34, and also since the dogs are pivoted to the rails 33. Upon rearward movement of the carriages 22 and 23, there will be relative movement between the rails 29 and the side bars 11, but no relative movement between the rails 33 and the side bars 11. During the rearward movement of the carriages 22 and 23, the dogs 30, upon striking side bars 11 supported on the rails 29, will swing around their pivotal mountings and pass under the side bars 11, the latter now being held against rearward movement by the dogs 34 on the rails 33.

Secured to the outer ends of the cross members 19 of supporting frame 16 are collars 35 having laterally projecting clamping members 36 in which supports 37 are adjustably secured (see particularly Fig. 3). The supports 37 terminate at their upper ends in clamping members 38 in which are adjustably secured rods 39. Secured to the rods 39 are split clamping collars 40 to which are secured guides 41, the latter being in the form of angle irons. These guides 41 maintain the side bar members 11 properly positioned upon the conveyer during the travel of the side bars therealong. By the particular mounting of the guides as just described, the guides may be adjusted laterally to suit members 11 of varying lengths, and may be adjusted vertically to properly correspond with the height to which the rails 29 and 33 are adjusted.

The truck loading mechanism

When the carriage 22 is moved toward the discharge end of the conveyer, the feed dogs 30 on the end of the carriage nearest the discharge end thereof carry a side bar element past the end 45 of the stationary rails 33 and on to short supporting rails 46. Fig. 5 shows the relative positions of the several parts just after a side bar 11 has been positioned upon the rails 46 and the carriage 22 has been withdrawn to initial position preparatory to moving the next succeeding side bar on to the rails 46. Pivotally secured to each of the supporting rails 46 intermediate its ends is a dog 47 having one end thereof normally projecting above the top of the rail 46 to prevent rearward movement of the side bar 11 after the latter has been positioned upon the rail 46 by the feed dogs 30 on carriage 22. A stop 47' is adjustably secured to the supporting rail 46 to properly position the side bar 11 with respect to the arms 13 of conveyer truck 14 upon which it is to be positioned.

The supporting rail 46 is secured to a retractable support 48, which at the proper time, is adapted to be lowered to load the side bar 11 on the arms 13 of truck 14. The retractable support 48 has a downwardly extending shank portion which is guided in a sleeve 49 which projects laterally from the collar 20 clamped to the cross bar 19 of the frame work 16 adjacent the discharge end of the conveyer.

When a truck 14 has been properly positioned adjacent the discharge end of the loader, the extensible arms 13 thereof are projected outwardly in a manner fully described in the application previously referred to. The outer end of each of the arms 13 is provided with an aperture 51 within which a dowel pin 52 on arm 53 is adapted to engage (see Fig. 2). The arm 53 is rigidly secured to a base 54 (see Fig. 2) upon which the rails 15 of the assembly line are mounted.

When a side bar 11 has been positioned upon the supporting rail 46 of the retractable support 48, the latter is lowered to lower the side bar 11 and position the same between jaws 55 and 56 on the outer end of the extensible arms 13 of the truck 14. Projecting from the upper faces of the extensible arms 13 are dowel pins 57 which are adapted to register with holes 58 in the side bars 11 to properly position the latter upon the arms of the truck. The jaws 56 on the arms 13 are urged toward jaws 55 by means of springs 59, and may be forced outwardly against the pressure of the spring by force applied to the inner jaw faces. By so mounting the jaws on the arms of the truck, the side bar 11 may be easily forced therebetween and is securely held thereon for subsequent conveyance along the assembly line where successive finishing operations are performed on the side bar. Fig. 6 shows the relative positions of the parts of the loading mechanism just after a side bar has been positioned upon the arms 13 of a conveyer truck 14.

In order to position a side bar 11 between jaws 55 and 56 on the arms 13, it is necessary to drive or push the bar down to cause retraction of the jaw 56. This is accomplished by means of pusher mechanism shown in Figs. 5 and 6. This pusher mechanism comprises a tubular member 60 which is reciprocatively mounted in a sleeve 61 projecting laterally from a clamping sleeve 62 which latter is secured to a cross frame member 63 supported from the frame 16 by means of supporting posts 64. Slidably disposed within the tubular member 60 is a rod 65 which is bifurcated at its lower end as at 66. Secured to the rod 65 at its lower end between the bifurcations thereof is a beam 67 the outer extremities of which terminate in clamps 68. Adjustably secured within these clamps are pushers 69 which, upon downward movement of the pusher mechanism, are adapted to engage the upper edges of the flanges of the side bar and drive the latter into position between jaws 55 and 56 on the arms 13 of the conveyer truck.

The rod 65 is provided with an enlarged portion 70 having an elongated slot 71 therein for the passage therethrough of a pin 72. The rod 65 is normally maintained in a lowered position, that is with the pin 72 disposed at the top of the elongated slot 71, by means of a spring 73. By thus mounting the pusher rod 65 slight recession thereof is permitted within the tubular member 60 against the force of spring 73. Such a recession of the rod 65 is desirable in case the pusher mechanism is driven downwardly after the side bar 11 has engaged the upper faces of the arms 13 of a truck 14 or in case of variations in the width of the flanges of the side bars 11, thereby eliminating any possibility of breakage of parts of the loading mechanism which might otherwise occur were it not for the yieldable mounting of the rod 65 within tubular member 60.

Driving mechanism

As fully described in the application filed June 1, 1931, Serial No. 541,424, above referred to, the conveyer trucks 14 are intermittently driven along an assembly line to position them at successive finishing stations. Upon arrival of a truck at a station, the arms 13 carrying an element 11 are projected outwardly to position the element 11 between the operating jaws of a finishing machine. The jaws of the finishing machine are then actuated to perform a finishing operation. This actuation of the jaws of the finishing machines is accomplished by means of a pair of rack bars which are operated in opposite directions to drive a pinion secured to the drive shaft of each machine. Reverse actuation of the rack bars returns the jaws of the finishing machines to initial inoperative position.

In order to cause operation of the truck loading device of this application simultaneously with the actuation of the several finishing machines, the same rack bars which drive the finishing machine are also employed to drive the loading device. These rack bars are indicated in Fig. 2 by the reference characters 80 and 81. The rack bars 80 and 81 upon actuation in opposite directions drive a pinion 82 secured to one end of a shaft 83. The other end of the shaft 83 is journaled in a bearing 84 secured to a gear housing 85 (see Fig. 8). Secured to the end of the shaft 83 within the gear housing 85 is a bevel gear 86 which meshes with a bevel gear 87 secured to a cross shaft 88 mounted in the gear housing 85. Also secured to the shaft 88 is a pinion 89 which meshes with a gear segment 90 mounted upon a shaft 91. The shaft 91 is journaled in the gear housing 85 and is further journaled in bearings carried by standards 92 as shown in Fig. 3. The gearing between the rack bars 80 and 81 and the shaft 91 is so proportioned as to cause rocking of the shaft 91 back and forth through an angle of approximately 180° upon completion of one cycle of operations of the rack bars.

Secured to shaft 91 between the gear housing 85 and the next adjacent standard 92 is a crank arm 93. Pivotally secured at one end thereof to the free end of crank arm 93 is a link 94, the other end of which is pivotally secured to a rocker arm 95. The rocker arm 95 is pivotally secured intermediate its ends to a support 96. To the extreme upper end of the rocker arm 95 is pivotally secured a forked link 97, the bifurcations of which are pivotally secured to collars 98 secured to cross member 99 of conveyer carriage 22. Also pivotally secured to the rocker arm 95 between its pivotal mounting and its upper extreme end is a second forked link 100, the bifurcations of which are secured to collars 101 mounted on a cross member 102 of conveyer carriage 23. Thus, upon actuation of the rack bars 80 and 81 to rotate pinion 82 in one direction the conveyer carriages 22 and 23 will be driven toward the discharge end of the loading device thereby delivering a side bar element 11 upon the supporting rails 46 of the retractable supports 48 and into position to be loaded upon the arms 13 of conveyer truck 14. Upon reverse movement of the rack bars 80 and 81 the pinion 82 will be rotated in the opposite direction and the carriages 22 and 23 will be withdrawn to initial driving position preparatory to carryng the next succeeding side bar element 11 on to retractable supports 48 and also driving the other elements 11 on the conveyer mechanism one step closer to the discharge end of the conveyer.

Since the forked link 100 which drives carriage 23 is pivotally secured between the pivotal mounting of the rocker arm 95 and its extreme upper end, the carriage 23 will have a shorter throw than the throw of the carriage 22. This difference in the throw of the carriages is provided in order to make possible the disposition of a larger number of side bars 11 upon the conveyer mechanism than would otherwise be possible were all of the bars 11 fed a distance equal to the throw of carriage 22. The throw of carriage 22 is determined by the proximity which the next to the last element 11 can be brought to the last element 11 on the conveyer.

Also secured to shaft 91 is a crank arm 105, the free end of which is pivotally connected to one end of a link 106. The other end of link 106 is pivotally secured to a pair of cam plates 107, 108 (see Figs. 5 and 7). Cam plate 107 is mounted for sliding movement in guides 109, 110 in a cam box 111 and the cam plate 108 is similarly mounted in guides 112, 113. Cam plate 107 is provided with a cam slot 114 within which rides a roller 115 pivotally secured to the free end of a crank arm 116. The crank arm 116 is secured to a shaft 117 which shaft has one end mounted in a bearing 118 in the cam box 111 and its other end journaled in a standard 119 (see Fig. 3).

Secured to the shaft 117 adjacent the standard 119 is a crank arm 120, the outer free end of which is pivotally secured to one end of a link 121. The other end of the link 121 is pivotally secured to the outer end of one arm of a bell crank lever 122, 123 which lever is suspended from a collar 124 secured to frame member 63. The outer end of the other arm 123 of the bell crank lever is pivotally secured to a rod 125, which rod is pivotally secured to and suspended by bell crank levers 126, 127 pivotally secured to the frame members 63 in a manner similar to the suspension of the bell crank lever 122, 123.

The outer end of arm 127 of each of the bell crank levers 126, 127 is bifurcated to form a yoke which is adapted to straddle the tubular member 60 of the pusher mechanism. Each furcation of the yoke shaped portion of the arms 127 is recessed, as at 128, and the outer extremities of the pins 72 are adapted to be disposed within the recesses 128 to constitute a driving connection between the bell cranks 126, 127 and the pusher mechanism.

The cam slot 114 is formed with a horizontal portion 130, an upwardly inclined portion 131, and a downwardly inclined portion 132. During movement of cam plate 107 to the left as viewed in Fig. 5 and at the time when roller 115 is riding in the horizontal portion 130 of the cam slot 114 no motion will be imparted to the crank arm 116 and hence a dwell is provided in the pusher mechanism. This dwell occurs at a time when a side bar element 11 is being positioned upon the supporting rails 46 of retractable supports 48 by the feed dogs 30 on the carriage 22. When roller 115 rides in the upwardly inclined portion 131 of the cam slot the crank arm 116 is swung around its axis thereby causing tilting of shaft 117 and consequent downward movement of the pusher mechanism to force a side bar element 11 between the jaws 55, 56 on the arms 13 of conveyer truck 14. The downwardly inclined portion 132 of the cam slot 114 then causes a slight upward movement of the pusher mechanism to free the pushers 69 from engagement with the side bar 11 to provide for unobstructed withdrawal of the side bar element 11 upon retraction of the arms 13 of the conveyer trucks 14 from cooperating position relative to the loading mechanism. Movement of the cam plate 107 to the right as viewed in Fig. 5 causes a correspondingly reverse movement of the pusher mechanism.

Cam plate 108 is provided with a cam slot 135 within which rides roller 136 which roller is secured to the free end of a crank 137 secured to a stub shaft 138 mounted in a bearing 139 in the cam housing 111. To the outer end of the shaft 138 is secured a crank arm 140, the free end of which is pivotally secured to one end of an adjustable link 141. The other end of the link 141 is pivotally secured to the lower end of the shank portion of one of the retractable supports 48 to cause actuation thereof at the proper times. The other retractable support 48 is simultaneously actuated in a similar manner through a crank 142 secured to shaft 91 and similar to crank 105, a link similar to link 106, and a cam plate similar to cam plate 108 mounted in a cam box 143.

The cam slots 135 of cam plates 108 for controlling the position of the retractable supports 48 have a horizontal portion 145 and an inclined portion 146. The horizontal portion 145 provides a dwell in the operation of the retractable support during part of the stroke of the rack bars 80 and 81 thus maintaining the rails 46 on supports 48 substantially flush with the rails 29 and 33 of the conveyer mechanism during the delivery of a side bar element 11 upon the rails 46 by the conveyer mechanism. The inclined portions 146 cause a swinging movement of the cranks 137 around their axes and produce a consequent lowering of the retractable supports 48 to bring the side bar elements into the proper position upon the arms 13 of the conveyer truck 14. The length of the inclined portions 146 of the cam slots is such that the rails 46 of the retractable support are brought to a position slightly below the upper face of the arms 13 of conveyer trucks 14 in order to accommodate unobstructed withdrawal of the side bar 11 upon retraction of arms 13 after the loading operation. Upon reverse movement of the rack bars 80 and 81, the retractable supports are raised to initial position for reception thereon of the next succeeding side bar element 11 from the conveyer carriage 22.

*Operation*

When a truck 14 has come to rest adjacent the discharge end of the loading device, and the arms 13 have been extended outwardly and into range of the loading mechanism, the parts of the loading device are as shown in Fig. 2. The rack bars 80 and 81 are then actuated in opposite directions to rotate pinion 82 and drive the cranks 105, 93, and 142 on shaft 91 from a position such as shown in Fig. 2 to a position such as shown in Fig. 5. During approximately the first 90° of rotation of these cranks, the pusher mechanism and the retractable support will be brought into position such as shown in Fig. 5. At the same time the carriages 22 and 23 will be moved toward the discharging mechanism 12 half the distance of their respective throws to convey elements 11 toward the discharge end of the loading device. During approximately the last 90° of rotation of the cranks 105, 93, and 142, there will be no movement of the retractable support 48 and the pusher mechanism, since the rollers 115 and 136 are at this time riding respectively in the horizontal portions 130, 145 of the cam slots 114, 135, respectively, in cam plates 107 and 108. The carriages, however, will continue to move the side bar elements 11 toward the discharge end of the loading mechanism, and when the cranks 93 have reached a position corresponding to the position of crank 105 as shown in Fig. 5, the side bar element 11 nearest the discharge end of the loading device will be positioned upon the supporting rails 46 of retractable supports 48.

Upon reverse actuation of the rack bars 80 and 81 the shaft 91 will be driven in a clock-wise direction as viewed in Fig. 5. During approximately the first 90° of rotation of the shaft 91, the cam plates 107 and 108 will be driven toward the left in Fig. 1 approximately half the distance of their respective throws. During this movement of the cam plates 107 and 108, the rollers ride in the horizontal portions 130, 145, respectively, of the cam slots 114, 135 thus causing a dwell in the pusher mechanism 12 and the retractable supports 48. At the same time, after the carriage 22 has delivered a side bar element 11 upon the supporting rails 46, the carriages 22 and 23 will be retracted toward the right, as viewed in Figs. 2 and 5, a distance equal approximately to half their respective throws.

During the next 90° of rotation of the shaft 91, the carriages 22 and 23 will be brought back to their extreme right-hand position, and the crank arms 93, 105, and 142 will be in a position corresponding to the position of crank arm 105 as shown in Fig. 2. These several cranks reach this position when the rack bars 80 and 81 reach one end of their respective strokes. At the same time the rollers 115 and 136 by riding in the inclined portions 131 and 146 respectively of the cam slots 114, 135 will cause the pusher mechanism and the retractable supports to be lowered to load or position a side bar element 11 on the extended arms 13 of the truck 14. When the rollers 136 approach the ends of the inclined portions 146 of their cam slots, the retractable supports 48 will be lowered a little below the upper face of the arms 13 of the conveyer truck 14 to provide clearance for withdrawal of the side bar 11 upon retraction of the arms 13. The roller 115 will at the same time ride in the downwardly inclined portion 132 of cam slot 114 and cause slight upward movement of the pushers 69 to permit of unobstructed withdrawal of the side bar 11. The side bar 11 will then be free from the retractable support 48 and the pushers 69, and at this time the arms 13 are retracted and the truck 14 is thereafter conveyed along the rails 15 to the first finishing station on the assembly line. When the truck has reached the first finishing station, the next succeeding truck has reached a position adjacent the loading device. The arms 13 of the trucks are then extended, the truck at the finishing station positioning the side bar 11 thereon between the jaws of a finishing machine and the truck adjacent the loading device extending its arms 13 to within range of the loading device for reception thereon of the next side bar 11. The cycle of operations of the loading device is then repeated.

While only one loading device has been described, it is to be understood that a similar device is located on the opposite side of the assembly line to load side bar elements 11 on arms 13 which are projected from the truck 14 on that side of the line. It is to be further understood that while the loading device has been described in connection with side bar elements 11, of automobile frames, it may also be used in connection with any object which is to be loaded upon a conveyer truck or similar device.

Although the foregoing description is necessarily of a detailed character in order to completely set forth the invention, it is to be understood that the specific terminology is not intended to be restrictive or confining and it is to be further understood that various rearrangements of parts and modifications of structural detail may be resorted to without departing from the scope or spirit of the invention as herein set forth.

Having thus described the invention, what is claimed and desired to be secured by Letters Patent is:

1. A machine for loading a conveyer truck having article retaining jaws thereon comprising a retractable support disposed to sustain an article in a position above said truck, means for delivering the article to said retractable support, means for lowering said support, and means for forcing the article between said retaining jaws to securely position the article on said truck.

2. A machine for loading a conveyer truck having article retaining jaws thereon comprising a retractable support disposed to sustain an article in a position above said truck, means for delivering the article to said retractable support, means for lowering said support, means for forcing the article between said retaining jaws to securely position the article on said truck, and a common drive for actuating said several means in timed relation.

3. A machine for loading a conveyer truck having article retaining jaws thereon comprising a retractable support disposed to sustain an article in a position above said truck, a step-by-step conveyer for delivering separate articles successively to said retractable support, means for lowering said support, and pusher mechanism for forcing the article between said retaining jaws to securely position the article on said truck.

4. A machine for loading a conveyer truck having article retaining jaws thereon comprising a retractable support disposed to sustain an article in a position above said truck, a step-by-step conveyor for delivering separate articles successively to said retractable support, means for lowering said support, pusher mechanism for forcing the article between said retaining jaws to securely position the article on said truck and common driving means for actuating said conveyer, lowering means, and pusher mechanism in timed relation.

5. The combination with a conveyer truck having extensible arms, of mechanism for positioning an article on said arms when the same are extended outwardly, said mechanism comprising means for disposing the article in a position above said arms, and means for lowering and properly positioning the article upon the arms.

6. The combination with a conveyer truck having extensible arms, of mechanism for positioning an article on said arms when the same are extended outwardly, said mechanism comprising a retractable support disposed to sustain the article in a position above said arms, means for delivering the article to said retractable support, and means for lowering said support and positioning the article upon the extended arms of said conveyer truck.

7. The combination with a conveyer truck having extensible arms of mechanism for positioning an article on said arms when the same are extended outwardly, said mechanism comprising a retractable support disposed to sustain the article in a position above said arms, means for delivering the article to said retractable support, means for lowering said support to position the article upon the extended arms of said conveyer truck, and common driving means for actuating said delivering means and lowering means in properly timed relation.

8. The combination with a conveyer truck having extensible arms and spring pressed jaws on said arms, of mechanism for positioning an article between said jaws when the arms are extended outwardly, said mechanism comprising means for disposing the article in a position above the jaws, means for lowering the article, and means for forcing the article between said jaws to securely position the article therein.

9. The combination with a conveyer truck having extensible arms and spring pressed jaws on said arms, of mechanism for positioning an article between said jaws when the arms are extended outwardly, said mechanism comprising means for disposing the article in a position above the jaws, means for lowering the article, means for forcing the article between said jaws to securely position the article therein, and a common drive for actuating said several means in timed relation.

10. The combination with a conveyer truck having extensible arms and spring pressed jaws on said arms, of mechanism for positioning an article between said jaws, said mechanism comprising a retractable support disposed to sustain the article in a position above said jaws when the arms of said truck are extended outwardly, a conveyer for delivering the article to said retractable support, means for lowering said support, and pusher mechanism for forcing the article between the jaws to properly and securely position the article on the arms of said conveyer truck.

11. The combination with a conveyer truck having extensible arms and spring pressed jaws on said arms, of mechanism for positioning an article between said jaws, said mechanism comprising a retractable support disposed to sustain the article in a position above said jaws when the arms of said truck are extended outwardly, a conveyer for delivering the article to said retractable support, means for lowering said support, pusher mechanism for forcing the article between the jaws to properly and securely position the article on the arms of said conveyer truck, and common driving means for actuating said conveyer, lowering means, and pusher mechanism in properly timed relation.

12. In a loading machine the combination of a retractable support and a pusher mechanism cooperating therewith for effecting the seating of an article when delivered by the retractable support to a conveyer truck.

13. In a loading machine the combination of a retractable support, a pusher mechanism cooperating therewith for positioning an article when delivered by the retractable support to a conveyer truck, and a common driving means for actuating said retractable support and pusher mechanism in timed relation.

14. In a loading machine the combination of a retractable support, a pusher mechanism cooperating therewith for positioning an article when delivered by the retractable support to a conveyer truck, common driving means for actuating said retractable support and pusher mechanism, and cams for controlling and properly timing the operation of said retractable support and pusher mechanism.

15. In a loading mechanism for conveyer systems, in combination, an intermittently driven assembly conveyer provided with a plurality of trucks, a plurality of arms provided on each truck and disposed for lateral movement relative to the trucks, an auxiliary step-by-step conveyer disposed to move at right angles to the line of the truck conveyer, means for receiving the articles to be loaded from the step-by-step auxiliary conveyer one-by-one, and transfer means actuated to effect the transfer of an article to a truck each time the assembly conveyer pauses.

16. In a loading mechanism for conveyer systems, in combination, an intermittently driven assembly conveyer provided with a plurality of trucks, a plurality of arms provided on each truck and disposed for lateral movement relative to the trucks, an auxiliary step-by-step conveyer disposed to move at right angles to the line of the truck conveyer, means for receiving the articles to be loaded from the step-by-step auxiliary conveyer one-by-one, transfer means actuated to effect the transfer of an article to a truck each time the assembly conveyer pauses, and means provided on the laterally movable arms for holding the article delivered in a predetermined position.

17. In a loading mechanism for conveyer, systems, in combination, an intermittently driven assembly conveyer provided with a plurality of trucks, a plurality of arms provided on each truck and disposed for lateral movement relative to the trucks, an auxiliary step-by-step conveyer disposed to move at right angles to the line of the truck conveyer, means for reeciving the articles to be loaded from the step-by-step auxiliary conveyer one-by-one, transfer means actuated to effect the transfer of an article to a truck each time the assembly conveyer pauses, means provided on the laterally movable arms for holding the article delivered in a predetermined position, and means disposed to function in synchronism with the transfer means cooperative to press the article into position in the laterally movable arms.

18. In a side bar assembly line, in combination, an assembly conveyer provided with a plurality of trucks, means for giving the side bar assembly conveyer a step-by-step movement, laterally movable arms provided on each truck, transfer means for delivering side bars to the laterally movable arms, an auxiliary conveyer for feeding side bars to the transfer means, and an auxiliary drive operated in timed relation with the main conveyer drive for actuating the auxiliary conveyer, and transfer means to effect the delivery of the side bars one-by-one to the trucks of the main assembly conveyer as they pause in their intermittent movement.

19. In a side bar assembly line, in combination, an assembly conveyer provided with a plurality of trucks, means for giving the side bar assembly conveyer a step-by-step movement, laterally movable arms provided on each truck, transfer means for delivering side bars to the laterally movable arms, an auxiliary conveyer for feeding side bars to the transfer means, and an auxiliary drive operated in timed relation with the main conveyer drive for actuating the auxiliary conveyer, transfer means to effect the delivery of the side bars one-by-one to the trucks of the main assembly conveyer as they pause in their intermittent movement, and means cooperative for setting the side bars in predetermined positions on the laterally movable arms.

20. In a loader mechanism for conveyer systems provided with a plurality of trucks disposed to be moved intermittently from station to station, in combination, a plurality of carriages disposed for reciprocatory movement at right angles to the line of travel of said trucks, the throw of the forward carriage being greater than that of the other carriage, guides associated with the carriages for supporting articles, and means disposed on the carriages for engaging articles carried by the guides as the carriages move in a forward direction, to thereby advance the article step-by-step.

21. In a loading mechanism for conveyer systems provided with a plurality of trucks disposed to be moved intermittently from station to station to receive articles to be worked upon, in combination, means for feeding the articles one at a time, means for receiving the articles disposed in vertical movement, laterally movable arms carried by the truck, and means for actuating the transfer means downwardly to deliver an article to the laterally movable arms, said feeding means, transfer means, and laterally movable arms being operated in a predetermined sequence.

22. In a machine for loading articles, in combination, means for receiving the article to be loaded, a retractable support for carrying the article in a predetermined relation to the receiving means, means for causing the article to seat in a predetermined position on the article receiving means, and means for actuating the retractable support to permit the seating of the article in the receiving means.

23. In a machine for loading articles, in combination, means for receiving the article to be loaded, a retractable support disposed for movement to different elevations for carrying the article, means for seating the article in a predetermined position in the receiving means, and means for actuating the retractable support to different elevations for carrying the article in the desired position relative to the receiving means and for releasing it when seated in a predetermined position in the receiving means.

24. In a machine for loading articles, in combination, means for receiving the article to be loaded, a retractable support for carrying the article in a predetermined position relative to the receiving means, means for applying force to the article to cause it to seat in a predetermined position on the receiving means, means for actuating the retractable support, and means for seating the article in cooperative relation to release the article before the seating operation has been started.

25. In a machine for loading articles, in combination, means for receiving the article to be loaded, a retractable support for carrying the article in a predetermined relation to the receiving means, said retractable support being disposed for movement along vertical lines, means for pressing the article downwardly to seat it in the receiving means, means for actuating the retractable support, and means for pressing the article downwardly in proper timed relation to effect the release of the article and the proper seating of it in the means for receiving it.

AXEL JANSON.